US006962442B2

(12) United States Patent
Braun

(10) Patent No.: US 6,962,442 B2
(45) Date of Patent: Nov. 8, 2005

(54) FLUID TRAP FOR OIL MIGRATION

(75) Inventor: Dieter Braun, Spaichingen (DE)

(73) Assignee: Minebea Co., Ltd. (JP)

( * ) Notice: Subject to any disclaimer, the term of this patent is extended or adjusted under 35 U.S.C. 154(b) by 57 days.

(21) Appl. No.: 10/632,624

(22) Filed: Aug. 1, 2003

(65) Prior Publication Data
US 2005/0025401 A1 Feb. 3, 2005

(51) Int. Cl.[7] .............................................. F16C 17/10
(52) U.S. Cl. ........................................ 384/110; 384/107
(58) Field of Search ................................. 384/110, 108, 384/115, 114, 107, 119

(56) References Cited

U.S. PATENT DOCUMENTS 5,246,294 A * 9/1993 Pan ............................. 384/110

* cited by examiner

Primary Examiner—Lenard A. Footland
(74) Attorney, Agent, or Firm—Schulte Roth & Zabel, LLP; Joel E. Lutzker; Anna Vishev

(57) ABSTRACT

A hydrodynamic bearing system for use in spindle motors having a shaft and a bearing sleeve. At least one bearing member is mounted an outer surface of the shaft. A fluid trap member is further provided in the bearing system, the fluid trap member being integrated into the bearing member. A fluid trapping cavity is formed between the fluid trap member and a surface of the bearing member.

27 Claims, 3 Drawing Sheets

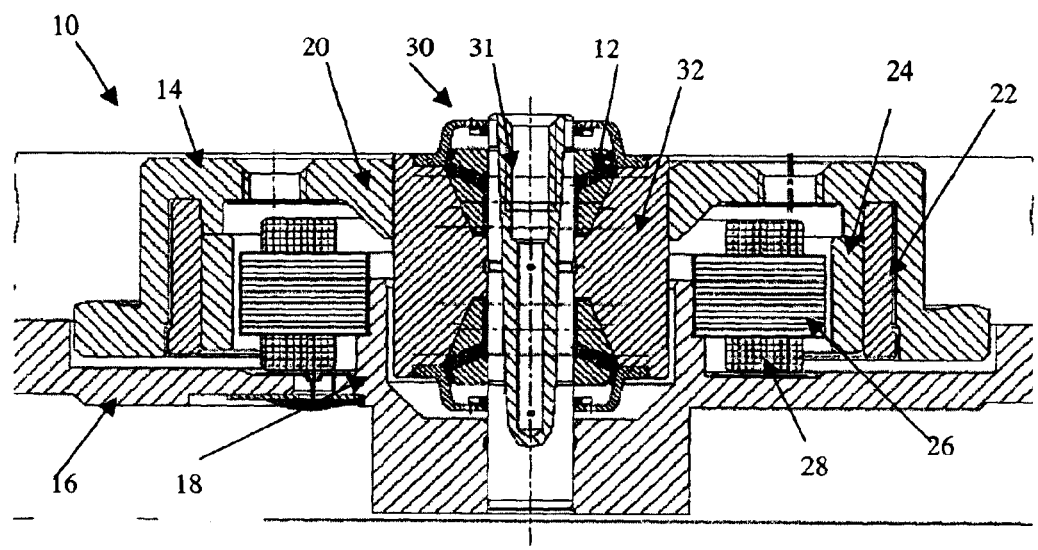
Fig. 1 Prior Art
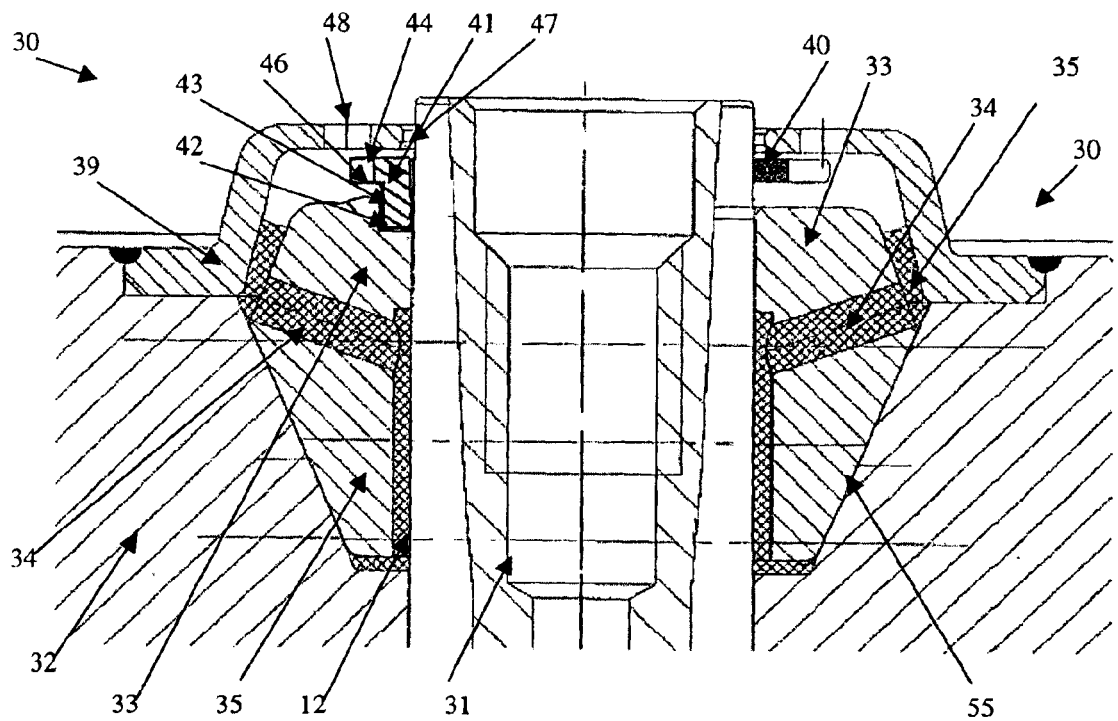
Fig. 2a　　　　　　　　　　　　　　　　　　　　　　　　　Fig. 2b

FLUID TRAP FOR OIL MIGRATION

FIELD OF THE INVENTION

The following application relates to the field of spindle motors and more specifically to a design that prevents lubricating oil from ascending the shaft into an outer environment.

BACKGROUND OF THE INVENTION

Disk drive systems have been used in computers and other electronic devices for many years for storage of digital information. Information is recorded on concentric memory tracks of a magnetic disk medium, the actual information being stored in the form of magnetic transitions within the medium. The disks themselves are rotatably mounted on a shaft or "spindle", the information being accessed by means of transducers located on a pivoting arm, which moves radially over the surface of the disk. The read/write heads or transducers must be accurately aligned with the storage tracks on the disk to ensure proper reading and writing of information; thus the disks must be rotationally stable.

Electric spindle motors are used to rotate the discs in disk drive systems. Such spindle motors may have either a fixed shaft and a rotating sleeve or a fixed sleeve and a rotating shaft. In recent years, there was an increase in demand for smaller size and lighter weight spindle motors. There was also an increase in demand for higher density of memory capacity in data recording devices such as magnetic disks and optical disks used in computers. These developments led to an increased demand for technologies increasing motors' rpm speed and improving rotation accuracies in spindle motors used to rotate such disks.

To address this demand with respect to bearings used to support rotating shafts in data storage devices, there has been an increasing trend away from conventional ball bearings toward the adoption of fluid dynamic pressure bearings. Fluid dynamic pressure bearings support a rotating shaft by generating a fluid dynamic pressure within lubricating fluid, for example oil or air, when the shaft is rotated.

Fluid dynamic pressure bearings are well known in the art. Structures which employ fluid dynamic pressure bearings as bearings for spindle motor rotating shafts are also well known (see, for example, Japanese Patent No. 2937833). An example of a conventionally known spindle motor having a fluid dynamic pressure bearing is shown as the conventional example in FIG. 1.

As shown in FIG. 1, spindle motor 10 includes rotor assembly 14 and stator assembly 16. Rotor assembly 14 comprises rotating hub 20 supported by bearing sleeve 32. Yoke 22 is provided in the lower portion of hub 20 for supporting permanent magnet 24. Stator assembly 16 comprises stationary frame 18 fixedly attached to shaft 31. Shaft 31 is inserted into an inner cylindrical bore of bearing sleeve 32. Stator core 26 having winding 28 is secured to an inner portion of frame 18 such that the stator core with the winding are positioned in an opposing relationship with permanent magnet 24.

Rotating bearing sleeve 32 and shaft 31 supporting the bearing sleeve for rotation define bearing portion 30, more particularly shown in FIGS. 2b and 3b. Bearing portion 30 includes bearing sleeve 32 secured to the hub and bearing member 33 secured to the shaft 31. Bearing member 33 is partly placed inside a conically-shaped recess formed within bearing sleeve 32. Bearing gap 55 is formed in the conical shaped area between the corresponding and opposing surfaces of bearing member 33 on one hand and bearing sleeve 32 on the other hand. Lubricating reservoir 35 is formed between the protruding part of bearing member 33 and shield 39. In order to equalize pressure differences along the bearing gap communication path 34 connects the inner end with the outer end of bearing gap and with the lubricating reservoir. Bearing gap 55 and lubricating reservoir 35 are filled with lubricating oil 12. At least one fluid dynamic pressure-generating groove (not shown) can be provided on one or more of the above mentioned surfaces.

When bearing sleeve 32 rotates, the fluid dynamic pressure generated by the fluid dynamic pressure-generating groove in the radial and thrust directions, enables the rotating bearing sleeve to rotate in a suspended state around shaft 31, with a film of lubricating oil interposed therebetween.

During operation of the above described spindle motor, lubricating oil 12 enclosed in bearing gap 55 between bearing member 33 and bearing sleeve 32 ascends to the opening surface at the top edge portion of sleeve 32. This oil ascending phenomenon may be caused by volumetric changes from temperature change-induced expansion and contraction of the lubricating oil, expansion displacement of the bearing dimensions, internal movement caused by the pumping effect at the start and stop of sleeve's rotation or effects of centrifugal forces and dynamic pressure during rotation, and mainly due to external shock.

This type of ascending of the lubricating oil such that it reaches and overflows the opening surface of the bearing sleeve creates the problem of lubricating oil leakage. Leakage and depletion of the lubricating oil from the bearing sleeve results in insufficient fluid dynamic pressure, reduced lubrication, and, in some cases, burning through contact between the rotating shaft and the bearing sleeve. At the same time leaking lubricating oil can lead to head sticktion or head crash thus making the magnetic disc unreadable.

As shown in FIGS. 4(a)–(c), a gap widening portion 37 having a tapered surface 36 is provided in conventional fluid dynamic bearing structures at the upper portion of the bearing sleeve to prevent leakage of lubricating oil. Gap widening portion 37 gradually expands at a specified angle of inclination a, as measured between the inner surface of bearing sleeve 32 and the axis of the shaft at the gap opening edge area. Thus, the upper portion of the gap gradually widens in the direction of the opening surface. Further, as shown in FIG. 4(c), the bearing may also include a lubricating oil reservoir 38 disposed on the inner surface of bearing sleeve 32, specifically, on the inside of tapered surface 36.

As disclosed in Japanese Patent No. 2937833, an oil collecting groove may be disposed on the inner surface of the bearing sleeve. A gap changing portion is also provided in the disclosed construction, wherein the gap expands towards the opening surface of the bearing sleeve. Taking a as the angle of gap's expansion towards the outside, an inner surface of the gap changing portion may be inclined at the angle α of 0° or greater. As is disclosed in the '833 patent, a gap inclination angle α of 0° indicates that it is acceptable to have a partial area of the gap changing portion being parallel to the rotating shaft.

As shown in FIGS. 2b and 3b, shield 39 is placed at each end of shaft 31 to seal the opening surface of bearing sleeve 32 from the environment, thus preventing lubricating oil from splashing onto the magnetic disk. However, shield 39 does not prevent oil from ascending the shaft. Typically, to prevent oil from splashing onto the shaft and then ascending the shaft into the environment, separate washer 40 is placed onto the shaft to trap the splashing and ascending fluid. As shown in FIG. 3c, washer 40 is provided with a pair of sparings 42 allowing for the oil to be injected into the bearing gap through oil filling holes 41 in shield 39. Accordingly, sparings 42 have to be aligned with oil filling holes 41. Therefore, washer 40 has to be installed with very exact tolerances and needs to be coated with an oil repelling agent before installation in order to ensure that lubricating oil is conveyed into the bearing gap. The oil repelling agent typically consists of a material with very low surface tension, for example fluorocarbon compounds. These processes of coating and installing washer 40 are expensive, time consuming and difficult to accomplish efficiently.

SUMMARY OF THE INVENTION

In one aspect of the present invention, a fluid dynamic bearing system is provided having a fluid trapping member incorporated into a bearing member. More specifically, the fluid dynamic bearing system for use in spindle motors has a shaft and a bearing sleeve. At least one bearing member is mounted on one of an outer surface of the shaft and an inner surface of the bearing sleeve. A fluid trap member is further provided in the bearing system, the fluid trap member being integrated into the bearing member. A fluid trapping cavity is formed between the fluid trap member and a surface of the bearing member. The fluid trap member is machined or injection molded from a material having low surface tension.

In another aspect of the present invention, a fluid dynamic bearing system is provided having a shaft, a bearing sleeve and a bearing member. The bearing member includes a fluid trapping portion, the fluid trapping portion extending from a surface of the bearing member and forming a fluid trapping cavity with this surface. The fluid trapping portion has a coating of a low surface tension material.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which:

FIG. 1 is a cross-sectional view of a conventional spindle motor incorporating a fluid dynamic bearing system.

FIG. 2a is a cross-sectional view of the fluid dynamic bearing system in accordance with the first embodiment of the present invention.

FIG. 2b is a cross-sectional view of the conventional fluid dynamic bearing system.

FIG. 2c is a top view of the fluid trap shown in FIG. 2a.

DETAILED DESCRIPTION OF THE PREFERRED EMBODIMENTS AND THE DRAWINGS

Figure 2C:
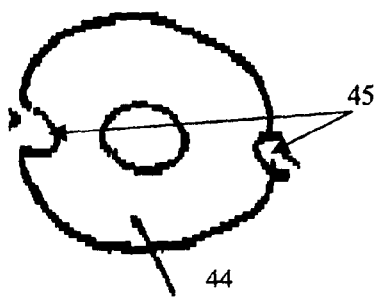

As shown in FIG. 2a, rotating bearing sleeve 32 and shaft 31 supporting the bearing sleeve for rotation define fluid dynamic bearing system 30. Bearing portion 30 includes a bearing sleeve 32 secured to the hub 20 and a bearing member 33 secured to the shaft 31. Bearing member 33 is partly placed inside a conical shaped recess of bearing sleeve 32. Bearing gap 55 is formed in the conical shaped area between the corresponding and interacting surfaces of bearing member 33 on one hand and bearing sleeve 32 on the other hand. Lubricating reservoir 35 is formed between the protruding part of bearing member 33 and shield 39. In order to equalize pressure differences along the bearing gap a communication path 34 connects the inner end with the outer end of bearing gap and lubricating reservoir. Bearing gap and lubricating reservoir are filled with lubricating oil 12. Although the invention is described with respect to a conical bearing system, a person skilled in the art will recognize that present invention can be utilized in any other known fluid dynamic bearing system.

At least one fluid dynamic pressure-generating groove (not shown) can be provided on one or more of the above mentioned bearing surfaces. When bearing sleeve 32 rotates, the fluid dynamic pressure generated by the fluid dynamic pressure-generating groove in the radial and thrust directions, enables the rotating bearing sleeve to rotate in a suspended state around shaft 31, with a film of lubricating oil interposed therebetween.

Shield 39 is placed at an end of shaft 31 to seal the opening surface of bearing sleeve 32 from the environment. Shield 39 is placed over shaft 31 such that the shaft protrudes through circular opening 47 of the shield. Oil fill holes 48 are provided on the shield 39 for injecting lubricating oil into the bearing system. Shield 39 is preferably laser welded to bearing sleeve 32.

In accordance with the first embodiment of the present invention, the first bearing member is provided with a fluid trap. Fluid trap 41 is preferably formed as an injection molded or a machined part using a material having very low surface tension, for example fluorocarbon (fc) material. Fluid trap 41, integrated with bearing member 33, is preferably L-shaped in its cross-section and comprises sleeve portion 43 and disc portion 44 (shown in FIG. 2c). Sleeve portion 43 is preferably pressed into recess 42 on top of bearing member 33. A pair of sparings 45 is provided on disc portion 44 of the fluid trap. When the bearing system is assembled, sparings 45 are aligned with oil fill holes 48 of the shield to facilitate oil filling of the bearing gap. Oil trapping cavity 46 is preferably formed between disc portion 44 of the fluid trap and the upper surface of bearing member 33. When oil is splashed from the bearing gap during operation of the spindle motor, it is trapped in oil trapping cavity 46 and is not allowed to ascend the shaft into the environment. Since mutual tolerances of the first bearing member and the fluid trap are given by machined or molded parts, there is no problem in keeping tight tolerances between the trap and the bearing member. There is also no need to add an oil repelling agent to the surface of the fluid trap because it is made of a material having a low surface tension.

Figures 3A, 3B:
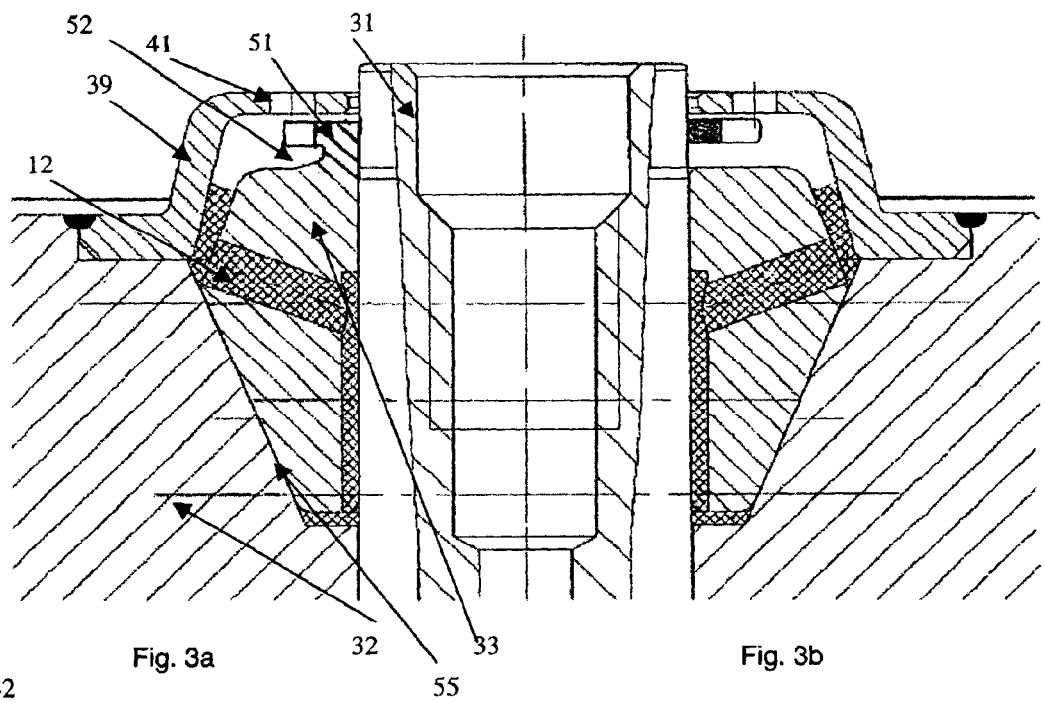
FIG. 3a is a cross-sectional view of the fluid dynamic bearing system in accordance with the second embodiment of the present invention.
FIG. 3b is a cross-sectional view of the conventional fluid dynamic bearing system.
Figure 3C:
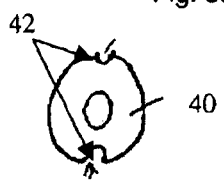
FIG. 3c is a top view of the washer shown in FIGS. 1, 2b and 3b.
Figure 4:
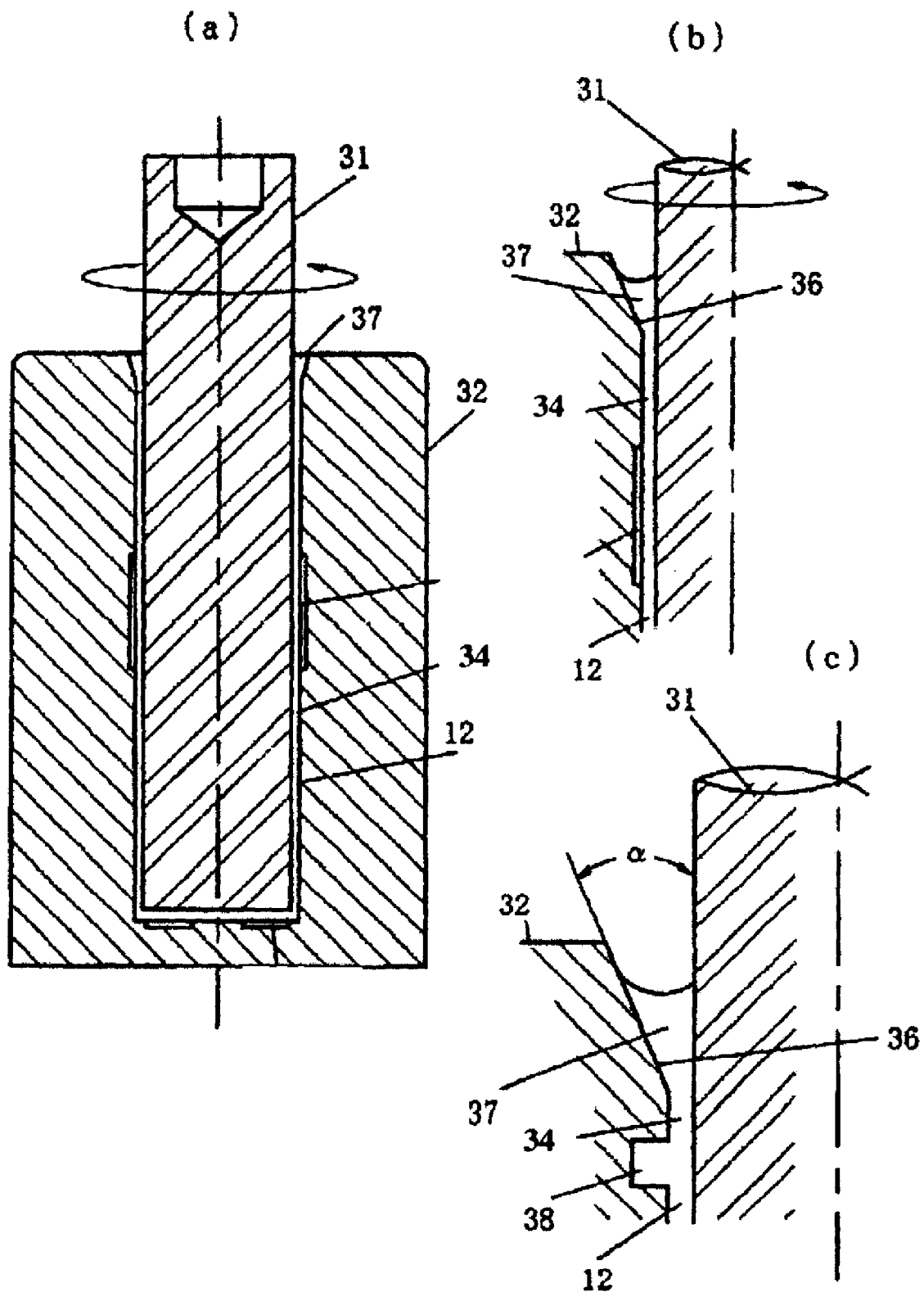
FIGS. 4a–c show cross-sectional views of a conventional fluid dynamic bearing.

The second embodiment of the present invention is shown in FIG. 3a, where fluid trap 51 is formed as a unitary part of the first bearing member. Fluid trap 51 extends above the upper surface of bearing member 33 and forms an oil trapping cavity 52 with this upper surface. Similarly to the first embodiment described above, fluid trap 51 is provided with a pair of sparings to enable the injection of lubricating oil into the bearing system. The surface of the fluid trap is preferably coated with a material having low surface tension.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine members of different embodiments, or to combine members of the embodiments described here with other modifications or variations that are not expressly described. Many of those undescribed variations, modifications and variations are within the literal scope of the following claims, and others are equivalent.

What is claimed is:

1. A hydrodynamic bearing system comprising:
    a shaft;
    a bearing sleeve;
    at least one bearing member mounted on an outer surface of said shaft;
    a bearing gap formed within said at least one bearing member; and
    a fluid trap member located outside said bearing gap,
    wherein said fluid trap member is integrated into said at least one bearing member and wherein a fluid trapping cavity is formed outside said bearing gap between said fluid trap member and a surface of said at least one bearing member.

2. The hydrodynamic bearing system according to claim 1, wherein said fluid trap member is injection molded from a material having surface energy lower than surface energy of a lubricating fluid.

3. The hydrodynamic bearing system according to claim 2, wherein said material is fluorocarbon.

4. The hydrodynamic bearing system according to claim 1, wherein said fluid trap member is machined from a material having surface energy lower than surface energy of a lubricating fluid.

5. The hydrodynamic bearing system according to claim 4, wherein said material is fluorocarbon.

6. The hydrodynamic bearing system according to claim 1, wherein said at least one bearing member is a conical bearing member.

7. The hydrodynamic bearing system according to claim 1, wherein said fluid trap member comprises a sleeve portion and a disc portion, said sleeve portion being pressed into said at least one bearing member.

8. The hydrodynamic bearing system according to claim 1 further comprising a shield enclosing an opening in said bearing sleeve, said shield comprising a pair of oil fill holes.

9. The hydrodynamic bearing system according to claim 8, wherein said fluid trap member further comprises a pair of sparings, said pair of sparings being axially aligned with said pair of oil fill holes.

10. A spindle motor having a hydrodynamic bearing system, said hydrodynamic bearing system comprising:
    a shaft;
    a bearing sleeve;
    at least one bearing member mounted on an outer surface of said shaft;
    a bearing gap formed within said at least one bearing member; and
    a fluid trap member located outside said bearing gap,
    wherein said fluid trap member is integrated into said at least one bearing member and wherein a fluid trapping cavity is formed outside said bearing gap between said fluid trap member and a surface of said at least one bearing member.

11. The spindle motor according to claim 10, wherein said fluid trap member is injection molded from a material having surface energy lower than surface energy of a lubricating fluid.

12. The hydrodynamic bearing system according to claim 11, wherein said material is fluorocarbon.

13. The spindle motor according to claim 10, wherein said fluid trap member is machined from a material having surface energy lower than surface energy of a lubricating fluid.

14. The hydrodynamic bearing system according to claim 13, wherein said material is fluorocarbon.

15. The spindle motor according to claim 10, wherein said at least one bearing member is a conical bearing member.

16. The spindle motor according to claim 10, wherein said fluid trap member comprises a sleeve portion and a disc portion, said sleeve portion being pressed into said at least one bearing member.

17. The spindle motor according to claim 10 further comprising a shield enclosing an opening in said bearing sleeve, said shield comprising a pair of oil fill holes.

18. The spindle motor according to claim 17, wherein said fluid trap member further comprises a pair of sparings, said pair of sparings being axially aligned with said pair of oil fill holes.

19. A hydrodynamic bearing system, comprising:
    a shaft;
    a bearing sleeve; and
    a bearing member having a bearing gap formed therein,
    wherein said bearing member further comprises a fluid trapping portion formed outside said bearing gap, said fluid trapping portion extending from a surface of said bearing member and forming a fluid trapping cavity with said surface, and wherein said fluid trapping portion comprises a coating of a material having surface energy lower than surface energy of a lubricating fluid.

20. The hydrodynamic bearing system according to claim 19, wherein said material is fluorocarbon.

21. The hydrodynamic bearing system according to claim 19, wherein said at least one bearing member is a conical bearing member.

22. The hydrodynamic bearing system according to claim 19 further comprising a shield enclosing an opening in said bearing sleeve, said shield comprising a pair of oil fill holes.

23. A spindle motor having a hydrodynamic bearing system, said hydrodynamic bearing system comprising:
    a shaft;
    a bearing sleeve; and
    a bearing member having a bearing gap formed therein,
    wherein said bearing member further comprises a fluid trapping portion formed outside said bearing gap, said fluid trapping portion extending from a surface of said bearing member and forming a fluid trapping cavity with said surface, and wherein said fluid trapping portion comprises a coating of a material having surface energy lower than surface energy of a lubricating fluid.

24. The spindle motor according to claim 23, wherein material is fluorocarbon.

25. The spindle motor according to claim 23, wherein said at least one bearing member is a conical bearing member.

26. The spindle motor according to claim 23 further comprising a shield enclosing an opening in said bearing sleeve, said shield comprising a pair of oil fill holes.

27. The hydrodynamic bearing system according to claim 26, wherein said fluid trap portion further comprises a pair of sparings, said pair of sparings being axially aligned with said pair of oil fill holes.

* * * * *